E. U. SCOVILLE.
Grain Drill.

No. 64,912.             Patented May 21, 1867.

Witnesses:

Inventor:

United States Patent Office.

ELIJAH U. SCOVILLE, OF MANLIUS, NEW YORK.

Letters Patent No. 64,912, dated May 21, 1867.

---

SEED-SOWER.

---

The Schedule referred to in these Letters Patent and making part of the same.

---

TO ALL WHOM IT MAY CONCERN:

Be it known that I, ELIJAH U. SCOVILLE, of Manlius, Onondaga county, New York, have invented a new and improved Seed-Sower; and I do hereby declare that the following is a full, clear, and exact description thereof, which will enable others skilled in the art to make and use the same, reference being had to the accompanying drawings, forming part of this specification, in which—

Figure 1:
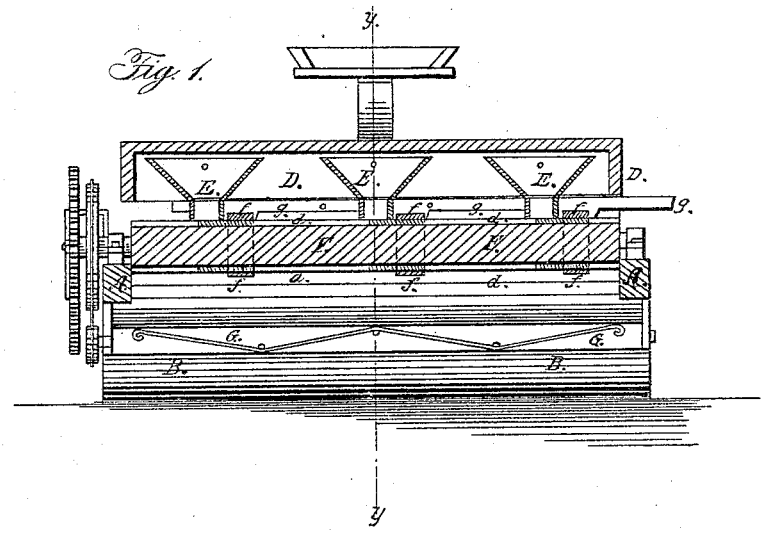
Figure 2:
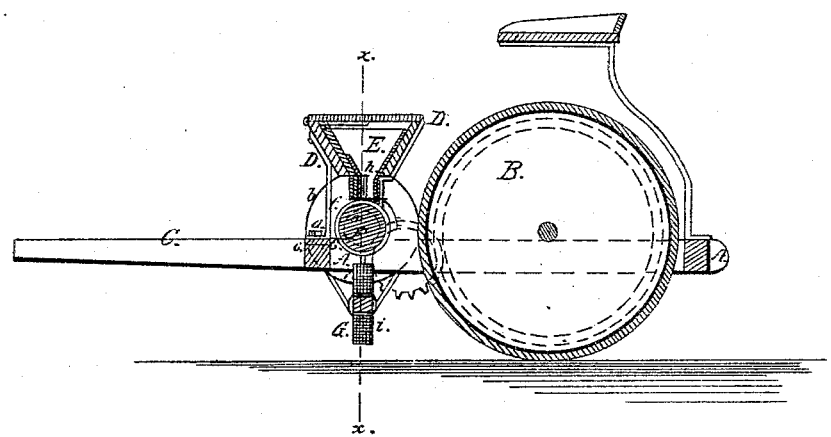

Figure 1 represents a vertical longitudinal section through the seed-box, the plane of section being indicated by line $x\ x$, fig. 2.

Figure 2, a vertical cross-section through my improved seed-sower, the plane of section being indicated by the line $y\ y$, fig. 1.

Similar letters of reference indicate corresponding parts.

This invention relates to a seed-sower by which all sorts of seeds, from the coarsest to the finest, can be sown, and which can be adjusted for sowing any desired quantity at once, so that the seed can be spread thicker or thinner, as may be desired.

The invention consists in the use of a revolving roller, which is arranged longitudinally below the seed-box. In the circumference of this roller are arranged longitudinal grooves, which receive the seed from the hoppers in the seed-box and distribute it upon or against a revolving zigzag wire sieve spreader, by which the seed is struck and spread evenly over the surface of the soil. The bottom of each hopper is made to be close above the distributing roller and can be adjusted on the same.

A represents a frame of suitable construction and description, which is mounted upon wheels or rollers B B, and which is arranged in any suitable or desirable manner. C is the tongue or pole to which the horses are attached. D is a seed-box, which is arranged across the frame A, and which is secured to the latter by means of screws $a\ a$, which pass through metal plates $b$ into some part of the frame A. The metal braces $b$ extend upwards and are secured to the outside of the seed-box, thereby supporting the latter. Between each plate $b$, and the bar of the frame upon which it rests, is interposed an India-rubber or other spring, $c$, which permits the up-and-down adjustment of the seed-box by the screw $a$. Within the seed-box is arranged any suitable number of hoppers, E E, which are made of sheet metal or other suitable material, and which are secured to the inner sides of the seed-box by means of pins or otherwise, so as to be easily removed when injured or used up, and as easily replaced. F is a roller which has its bearings in the frame A, and which is arranged directly below the seed-box and the hoppers, so as to completely close the discharge openings of the latter. The sides of the hopper extend downward so as to almost touch the roller F, the screw $a$ and spring $c$ serving to adjust the hoppers so that they can be held so close above the roller that no seed, not even the finest, can pass out between the lower edge of the hopper and the circumference of the roller, and that still all the friction be avoided. The roller F is provided with two or more grooves, $d\ d$, which extend from one end to the other of the roller, as is clearly shown in the drawings. These grooves, as the roller is revolved by any suitable mechanism, receive the seed from the hoppers and carry it around and drop it.

To regulate the amount of seed discharged into each groove at each turn of the roller, sliding plugs $e$ have been arranged, one in each groove below each hopper. All the slides below one hopper are secured to a metal ring, $f$, which surrounds the roller. The number of the rings does therefore correspond to that of the hoppers. The rings are all secured to a bar, $g$, which is operated by the driver or manager of the device, and by means of which those portions of the grooves $d$ which are under the hoppers E, and which receive the seed from the latter, can be more or less shortened, as the plugs $e$ close the said portions of the grooves more or less. In that side of the hopper towards which the seed is carried by the roller, (see arrow in fig. 2,) is arranged and secured an India-rubber scraper, $h$, which extends below the metal side of the hopper and touches the roller, while that metal side of the hopper does not extend quite as far down as the other sides. This scraper is to keep the seed from being carried around by the non-grooved portion of the roller, and it prevents the seed from being cut by the metal edge of the hopper. Below the roller is arranged in the frame A, and hung in suitable bearings and driven by suitable mechanism, a revolving horizontal shaft, G, which is parallel with the roller F, as shown. To this roller are secured wings, $i\ i$, which are made of wire netting or other suitable perforated material, by which the seed which drops from the roller is not blown, but struck and spread; some seed will even fall through the meshes of these wings. The latter are arranged in zigzag lines for the purpose of throwing the seed in different directions.

Having thus described my invention, what I claim as new, and desire to secure by Letters Patent, is—

1. Having two or more hoppers E within one seed-box D, substantially as and for the purpose herein shown and described.

2. The grooved roller F, when arranged below the hoppers, and when provided with adjustables slides $e\ e$, by which the amount of the seed discharged is regulated, substantially as set forth.

3. The revolving spreader G, when provided with perforated wings $i\ i$, substantially as and for the purpose herein shown and described.

4. The perforated wings $i\ i$, when arranged in zigzag lines upon a revolving shaft, G, substantially as and for the purpose herein shown and described.

5. The hoppers E, when arranged in a seed-box, D, which is supported by braces $b$, in combination with the spring $c$, and screw $a$, and roller F, substantially as herein shown and described.

6. The grooved roller F in combination with the rubber scrapers $h$, which are secured in that side of the hoppers E towards which the seed is carried by the roller, as set forth.

7. The zigzag perforated revolving spreaders $i\ i$, in combination with the grooved roller F, and hoppers E, all made and operating substantially as herein shown and described.

ELIJAH U. SCOVILLE.

Witnesses:
WM. F. McNAMARA,
ALEX. F. ROBERTS.